United States Patent [19]

Järvenkylä

[11] Patent Number: 5,018,959
[45] Date of Patent: May 28, 1991

[54] DEVICE FOR PRODUCING A GRATE CONSTRUCTION AND A GRATE CONSTRUCTION

[75] Inventor: Jyri Järvenkylä, Hollola, Finland

[73] Assignee: Uponor N.V., Sint Maarten, Netherlands Antilles

[21] Appl. No.: 465,119

[22] PCT Filed: Jul. 3, 1989

[86] PCT No.: PCT/FI89/00128
§ 371 Date: Feb. 15, 1990
§ 102(e) Date: Feb. 15, 1990

[87] PCT Pub. No.: WO90/00469
PCT Pub. Date: Jan. 25, 1990

[30] Foreign Application Priority Data

Jul. 5, 1988 [FI] Finland ................................. 883204

[51] Int. Cl.⁵ ................ B29C 47/26; B29C 97/34; B29C 93/22
[52] U.S. Cl. ................................. 425/325; 425/371; 425/377; 425/394; 425/408
[58] Field of Search ..................... 156/294.11; 264/DIG. 70, 167; 425/370, 371, 377, 378.1, 376.1, 380, 505, 519, 390, 395, 408, 325; 164/479, 481, 429, 431

[56] References Cited

U.S. PATENT DOCUMENTS

| | | | |
|---|---|---|---|
| 3,590,109 | 6/1971 | Doleman et al. | 264/167 |
| 3,789,322 | 12/1988 | Chan et al. | 425/390 |
| 3,860,057 | 1/1975 | Garlick | 164/481 |
| 4,164,439 | 8/1979 | Coonrad | 425/371 |
| 4,456,579 | 6/1984 | Rao et al. | 164/479 |
| 4,690,174 | 9/1987 | Järvenkyla | 138/121 |
| 4,721,598 | 1/1988 | Järvenkylä | 425/380 |
| 4,865,797 | 9/1989 | Järvenkyla | 264/515 |
| 4,867,928 | 9/1989 | Järvenkyla | 264/209.3 |
| 4,873,048 | 10/1989 | Järvenkyla | 264/508 |
| 4,936,768 | 6/1990 | Lupke | 425/392 |

FOREIGN PATENT DOCUMENTS

| | | |
|---|---|---|
| 364164 | 9/1981 | Austria . |
| 750699 | 11/1970 | Belgium . |
| 103057 | 3/1984 | European Pat. Off. . |
| 20171090 | 12/1986 | European Pat. Off. . |
| 1926187 | 11/1970 | Fed. Rep. of Germany . |
| 1937783 | 2/1971 | Fed. Rep. of Germany . |
| 1948407 | 4/1971 | Fed. Rep. of Germany . |
| 3728303 | 3/1989 | Fed. Rep. of Germany . |
| 2043609 | 2/1971 | France . |
| 7005449 | 11/1970 | Netherlands . |
| 517281 | 2/1972 | Switzerland . |
| 1508950 | 9/1989 | U.S.S.R. . |
| 1311998 | 3/1973 | United Kingdom . |

Primary Examiner—Willard E. Hoag
Attorney, Agent, or Firm—Ladas & Parry

[57] ABSTRACT

This invention relates to a device for the production of grate constructions. In general, such constructions are manufactured manually by connecting transverse ribs to elongated supporting means by welding. Grate constructions can be manufactured automatically at a single step by means of an extruder known from pipe manufacturing techniques. Chill moulds moving in the production direction are thereby modified in such a manner that the chill moulds comprise at least two moulding spaces communicating with each other by means of conduits.

5 Claims, 2 Drawing Sheets

DEVICE FOR PRODUCING A GRATE CONSTRUCTION AND A GRATE CONSTRUCTION

This invention relates to a device for producing grate constructions, comprising nozzle means for extruding plasticized material, and chill moulds moving one after another so as to define therebetween a moulding space after said nozzle means, the chill moulds travelling in the production direction within the area of the moulding space and comprising grooves on the mould surfaces facing the moulding space for forming ribs. As used herein, the term "grate construction" refers to constructions comprising elongated supporting means extending in parallel with each other, such as rods or tubes, and transverse ribs or the like interconnecting the supporting means. Constructions of this type are used widely, especially industrially, e.g., as working platforms in process industries. When the elongated means are tubes, the grate constructions can be used as heat exchangers or electrical heaters, whereby a heat storing medium or electrical resistors are placed in the tubes while the ribs form a large heat radiation surface. A ladder, too, is a kind of grate construction.

The production of grate constructions is slow and requires plenty of manual labour. The most usual practice is to manufacture the elongated means and ribs separately, whereafter they are possibly machined, and then interconnected by welding. This procedure limits the choice of materials as easily weldable and machinable materials only can be used, which causes problems with respect to corrosion resistance, for instance. Working platforms, for instance, cannot be made of chemically resistant plastic due to the technique used at the assembly stage.

The object of the present invention is to provide a device for the production of grate constructions at a single step. The device according to the invention is characterized in that the nozzle means comprise at least two adjacent nozzles, that the chill moulds form a moulding space at each nozzle, and that the moulding spaces communicate with each other by means of conduits formed in the chill moulds and connecting chill mould grooves surrounding adjacent moulding spaces with each other, for forming ribs extending from one elongated supporting means to be formed in the moulding space to another.

According to the invention, an extruder used in the production of ribbed pipes is modified in such a manner that the device can unexpectedly be used for continuously producing grate constructions, which increases the production rate, eliminates the need for manual labour and widens the choice of materials. The device according to the invention makes it possible to manufacture grate constructions of all extrudable materials, such as various plastics and metals and their mixtures, aluminium in particular.

In one embodiment of the device according to the invention, the grooves comprise, between the moulding spaces, at least one portion which is narrower than the rest of the groove. The produced construction can bend at this point, if desired.

By means of the device according to the invention, it is easy to manufacture constructions of greatly varying appearance, for aesthetic considerations, for instance. Thereby the device may be, e.g., such that grooves opening in adjacent moulding spaces are displaced with respect to each other in the longitudinal direction of the nozzles and the grooves communicate with each other through an interconnecting cavity for forming a thin material bridge.

In order to ensure that the material flows in adjacent moulding spaces join each other, the chill moulds may comprise means for heating them.

The invention is also concerned with a grate construction manufactured by means of the device, such as a heat exchanger or radiator comprising parallel tubular means and ribs transverse to the tubular means, the ribs being connected to and surrounding the tubular means. Prior art products are assembled of several parts interconnected by weld joints, for instance. Due to dimensional variations caused in the parts by production processes, the transferring of heat between the tubes and the ribs is not always the best possible.

The grate construction according to the invention is characterized in that the tubular means and the ribs are integral with each other. This enables the best possible transfer of heat in all cases.

BRIEF DESCRIPTION OF THE DRAWINGS

In the following the device according to the invention will be described in greater detail with reference to the attached drawing, wherein.

Figure 1:
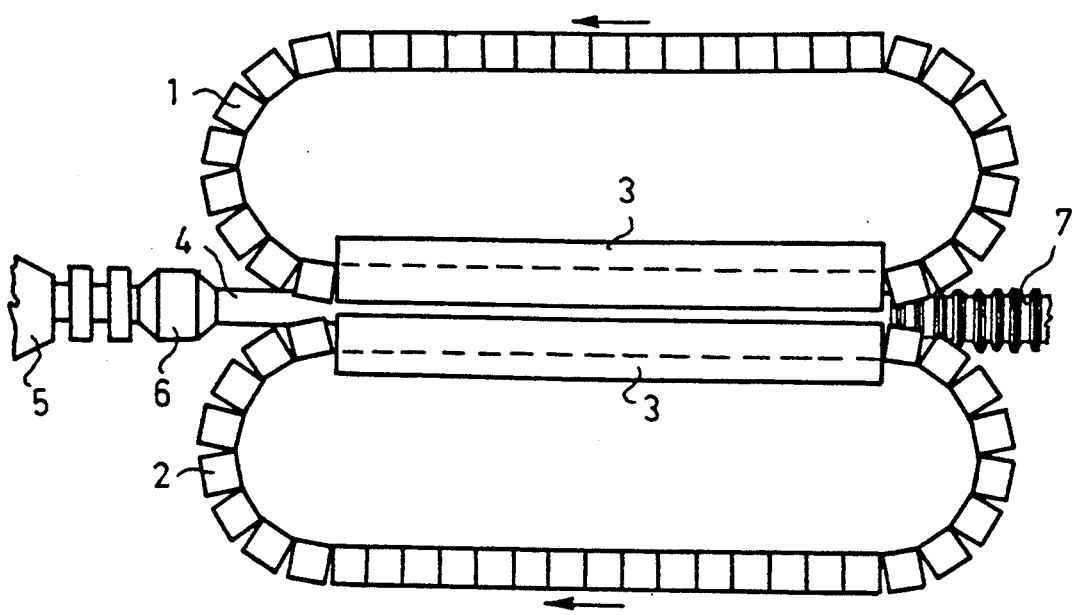
FIG. 1 is a general view of a device according to the invention.

The device shown in FIG. 1 comprises chill moulds 1 and 2 moving around along two endless paths and meeting each other within an area defined by guide rails 3 so as to form closed mould cavities. The device further comprises extrusion sleeves 4 connected to an extrusion head 6 in an extruder 5. It is also to be seen in FIG. 1 how a finished product 7 emerges from the other end of the device.

Figure 2:
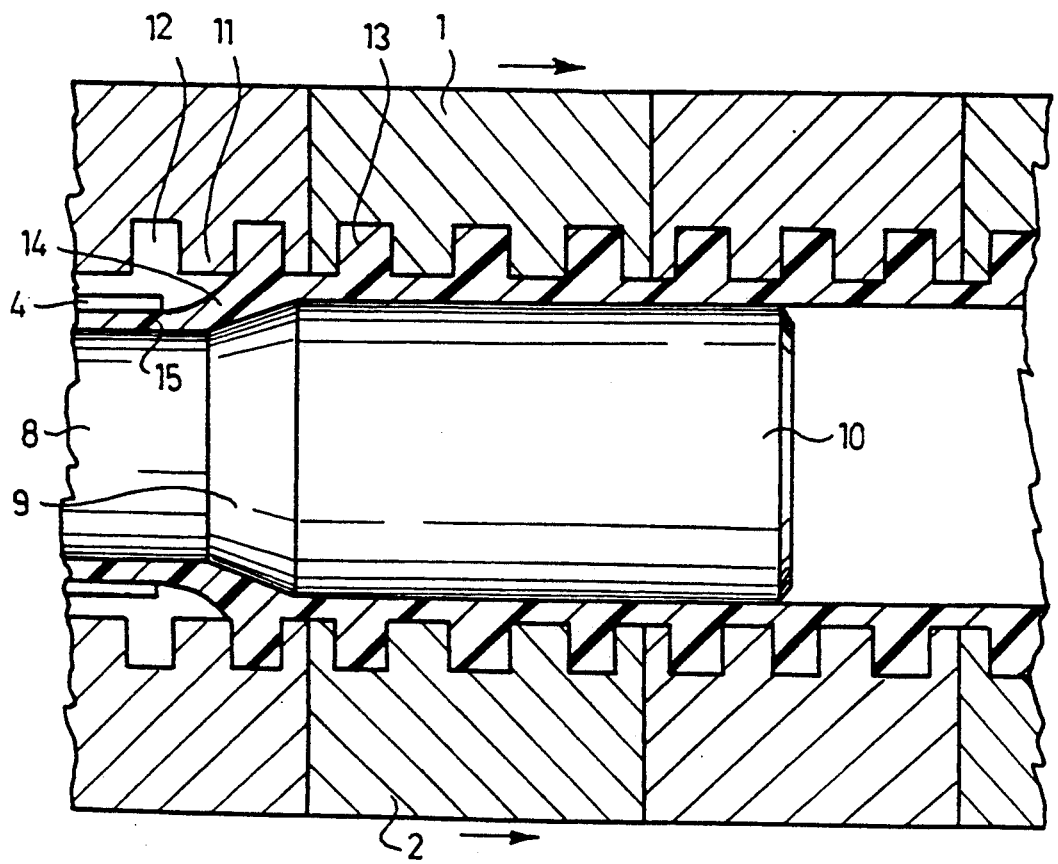
FIG. 2 is a vertical sectional view of a detail of the device.
Figure 3:
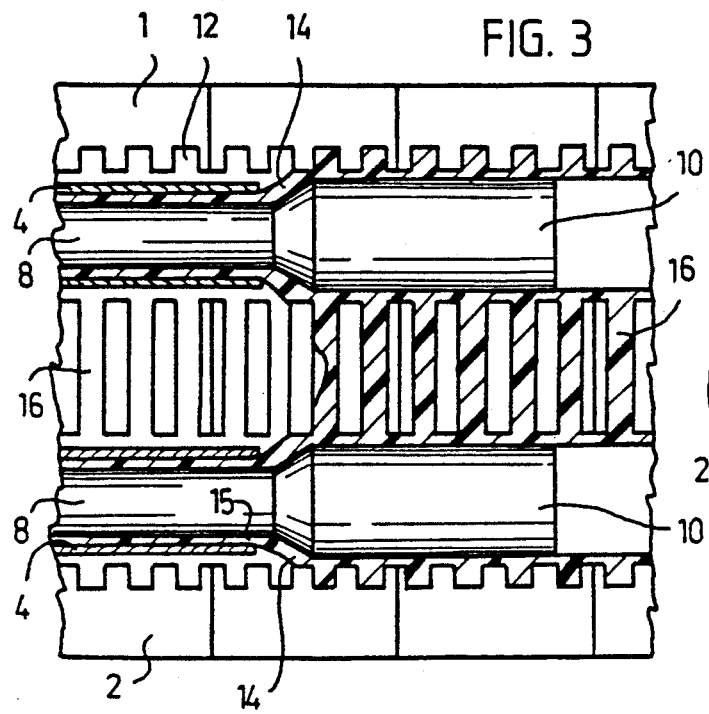
FIG. 3 is a horizontal sectional view of a detail of the device in the division plane of the chill moulds.

FIGS. 2 and 3 show in greater detail those parts of the device which participate in the moulding of the product. A mandrel 8 is positioned on the central axis of the extrusion sleeve 4. The mandrel comprises a conically enlarging part 9, and a cylindrical core 10 forms an extension of the conical part 9. The surface of the chill moulds facing the mandrel and the core is provided with ribs 11 and grooves 12 for the formation of ribs 13 in the product. The mandrel 8, 9, the extrusion sleeve 4 and the inner surface of the chill moulds define therebetween a moulding space 14 in which the product is moulded, at least to a very great extend. An annular nozzle 15 is provided between the end of the extrusion sleeve 4 and the mandrel 8 for feeding plasticized material into the moulding space 14.

According to the invention, the device comprises at least two adjacent nozzles 15, and the chill moulds 1, 2 are so wide that they form a moulding space 14 at each nozzle. In addition, the chill mould grooves 12 surrounding different moulding spaces 14 communicate with each other by means of conduits 16. Grooves 12 surrounding different nozzles 15 communicate all the time while the chill moulds are positioned against each other. In the embodiment shown, the conduits 16 are as wide as the grooves 12, so the conduits 16, in fact, are extensions of the grooves, interconnecting adjacent moulding spaces.

The device shown in FIGS. 1 to 3 operates in the following way. The plasticized material fed through the nozzles 15 is passed outwards in the moulding space 14 under the influence of the conical part 9 of the mandrel, thus entering the grooves 12 of the chill moulds and forming a product provided with ribs 13. As those portions of the grooves which are situated between adjacent moulding spaces communicate with each other by means of the conduits 16, the plasticized material enters these conduits, too, finally forming continuous material bridges between two adjacent moulding spaces.

Figure 4:
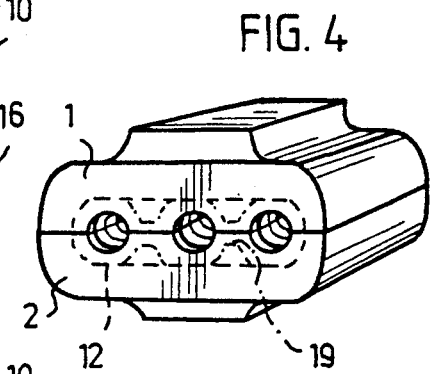
FIG. 4 is a perspective view of one pair of chill moulds.

FIG. 3 shows chill moulds comprising two adjacent moulding spaces 14, and FIG. 4 shows a pair of chill moulds in which three nozzles can be fitted. One groove 12, common to all three moulding spaces, is shown by broken lines in FIG. 4.

Figure 5:
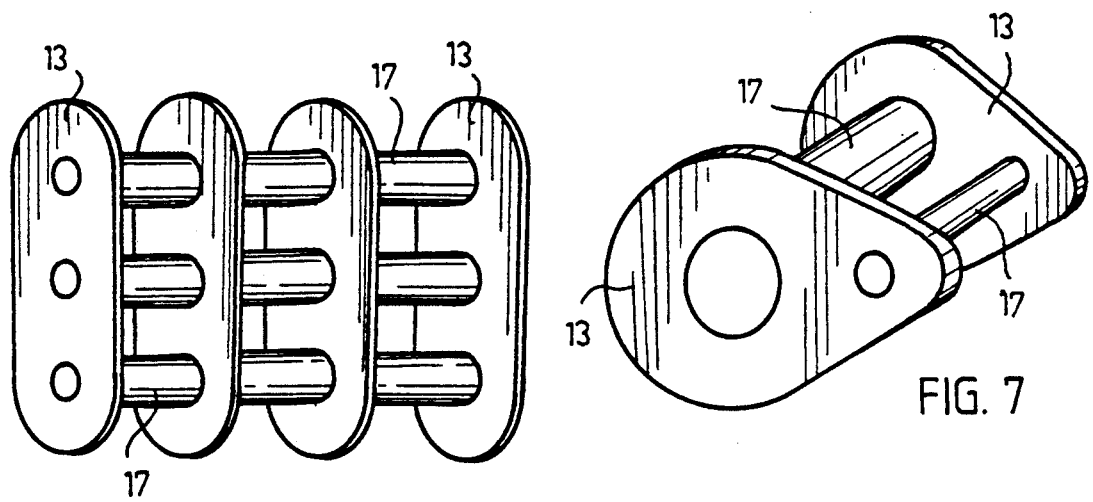
FIG. 5 shows a product manufactured by means of the chill moulds shown in FIG. 4.

FIG. 5 shows a grate construction manufactured by means of the chill moulds of FIG. 4. The grate construction comprises elongated tubular means 17 extending in parallel with each other and interconnected by mutually spaced flanges 13 transverse to the tubular means and integral with them.

Figure 6:
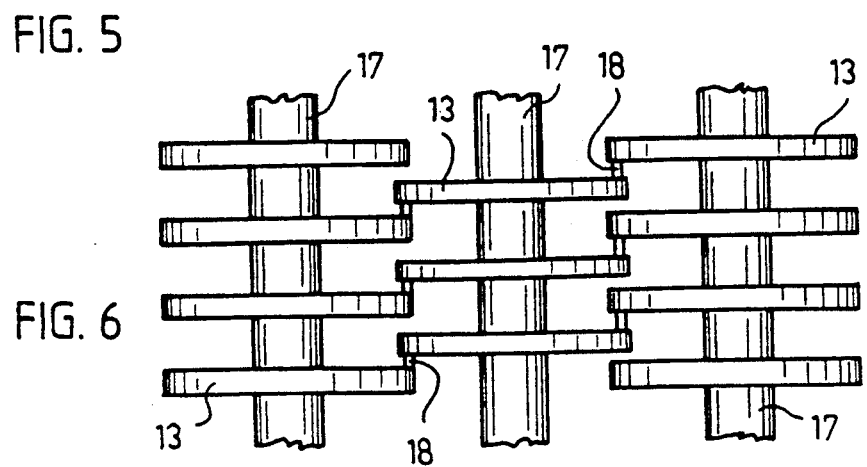
FIG. 6 shows another product.

FIG. 6 shows a grate construction differing from the solution of FIG. 5 in that the flanges 13 of the middle-most tubular means are on a different level than the flanges of the outermost tubular means. In this case, too, the flanges are interconnected by means of narrow interconnecting material bridges 18.

Figure 7:
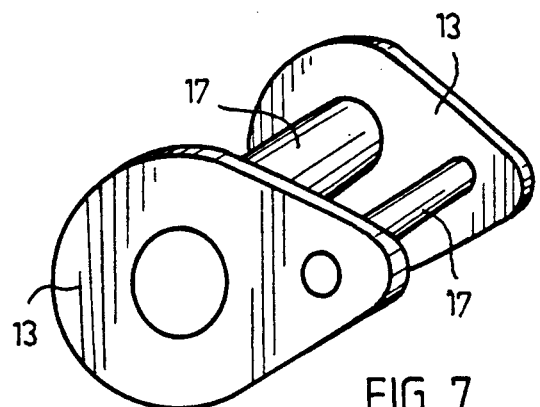
FIG. 7 shows still another product manufactured by means of the device according to the invention.

FIG. 7 shows an example of a construction in which adjacent tubular means differ in diameter. The radius of the ribs 13 varies correspondingly.

Solid rods in place of the tubular means 17 will be obtained if the mandrels 8, 9 and the cores 10 are omitted The grooves of the chill moulds can alternatively be positioned between the moulding spaces only, whereby the outer surface of the tubular means 17 is mostly even, and the material bridges are formed in the region between the tubular means only. Alternatively, the ribs may be helical.

In order to form narrow portions 19 in the ribs 13 between the supporting means 17, the inner surface of the chill moulds may be shaped in such a manner as shown by the dot-and-dash lines in FIG. 4. The construction so obtained can be bent along lines extending between the supporting means in parallel therewith.

In order to ensure that the plasticized material fills the grooves and the conduits completely, the chill moulds are preferably provided with heating means. The moulding space 14 is defined between the nozzle 4, the chill moulds 1,2 and a plug formed by cooled material The pressure required for the formation of solid supporting means 17 and ribs 13 is created in the feeding means.

I claim:

1. A device for producing grate constructions, comprising nozzle means for extruding plasticized material, and chill moulds moving one after another so as to define therebetween a moulding space after said nozzle means, the chill moulds travelling in the production direction within the area of the moulding space and comprising grooves on the mould surfaces facing the moulding space for forming ribs the nozzle means including at least two adjacent nozzles, that the chill moulds form a moulding space at each nozzle, and that the moulding spaces communicate with each other by means of conduits formed in the chill moulds and connecting chill mould grooves surrounding adjacent moulding spaces with each other, for forming ribs extending from one elongated supporting means to be formed in the moulding space to another.

2. A device according to claim 1, wherein the grooves or conduits comprise, between the moulding spaces, at least one portion narrower than the rest of the groove.

3. A device according to claim 1, wherein grooves surrounding in adjacent moulding spaces are displaced with respect to each other in the longitudinal direction of the nozzles, and that the grooves communicate with each other by means of an interconnecting cavity for forming a thin material bridge.

4. A device according to claim 1, including means for heating the chill moulds.

5. A device according to claim 1, wherein the moulding space is defined between the nozzle, the chill moulds and a plug of cooled material, and further comprising feed pressure means for the formation of solid supporting means and ribs.

* * * * *